United States Patent

[11] 3,604,516

| [72] | Inventor | Merwin J. Maxwell<br>Garden Grove, Calif. |
|---|---|---|
| [21] | Appl. No. | 854,455 |
| [22] | Filed | Sept. 2, 1969 |
| [45] | Patented | Sept. 14, 1971 |
| [73] | Assignee | Tower Manufacturing Company<br>Santa Ana, Calif. |

[54] ROLLOVER PLOW
13 Claims, 4 Drawing Figs.

[52] U.S. Cl. .................................................. 172/223,
172/161, 172/225
[51] Int. Cl. ......................................................... A01b 3/34
[50] Field of Search ........................................... 172/204,
161, 218, 219, 223, 224, 225, 226, 227

[56] References Cited
UNITED STATES PATENTS

| 2,625,090 | 1/1953 | Pursche .......................... | 172/227 |
| 2,923,362 | 2/1960 | Toland et al. ................... | 172/224 |
| 3,174,556 | 3/1965 | Knapp et al. .................... | 172/225 |
| Re. 26,129 | 12/1966 | Pursche .......................... | 172/227 |
| 3,517,749 | 6/1970 | Callahan ......................... | 172/225 |

OTHER REFERENCES
John Deere, Two-Way Plows, 9/1961
Atlas, Two-Way Plows, 5/1950

*Primary Examiner*—Robert E. Pulfrey
*Assistant Examiner*—C. W. Hanor
*Attorney*—Nienow & Frater ABSTRACT: A rollover plow whose frame includes an elongate, central, common support member held horizontally substantially in alignment with the direction of plow action by front and rear wheeled carriages. The frame is completed by a pair of plow frame members which have pivotal connection to the support frame on a common axis in the midregion of its length and which extend obliquely, one forwardly and one rearwardly, on opposite sides of the central support frame in a substantially horizontal plane. Hydraulic actuators permit rotation of those arms over the top of the center frame to a position in the horizontal plane on the opposite side. Each of the obliquely extending plow frame members supports a series of plow pairs so that one plow of each pair extends downwardly and the other plow of each pair extends upwardly.

PATENTED SEP 14 1971　　　3,604,516
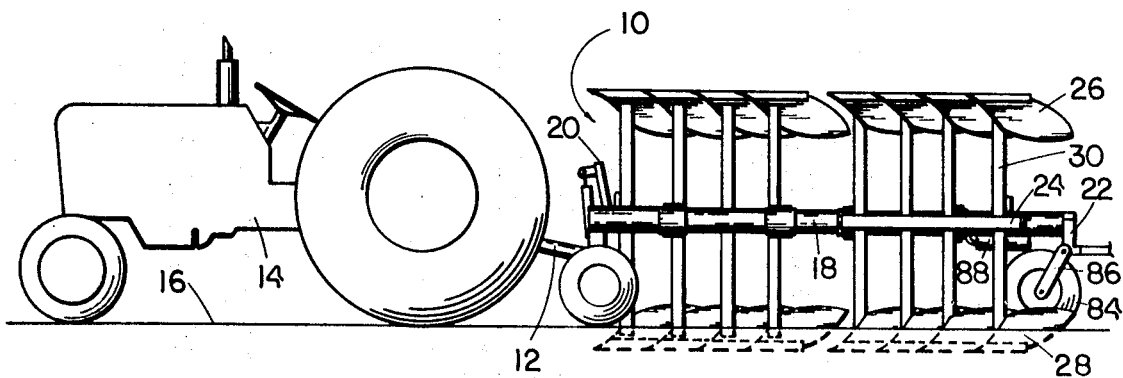
Fig. 1
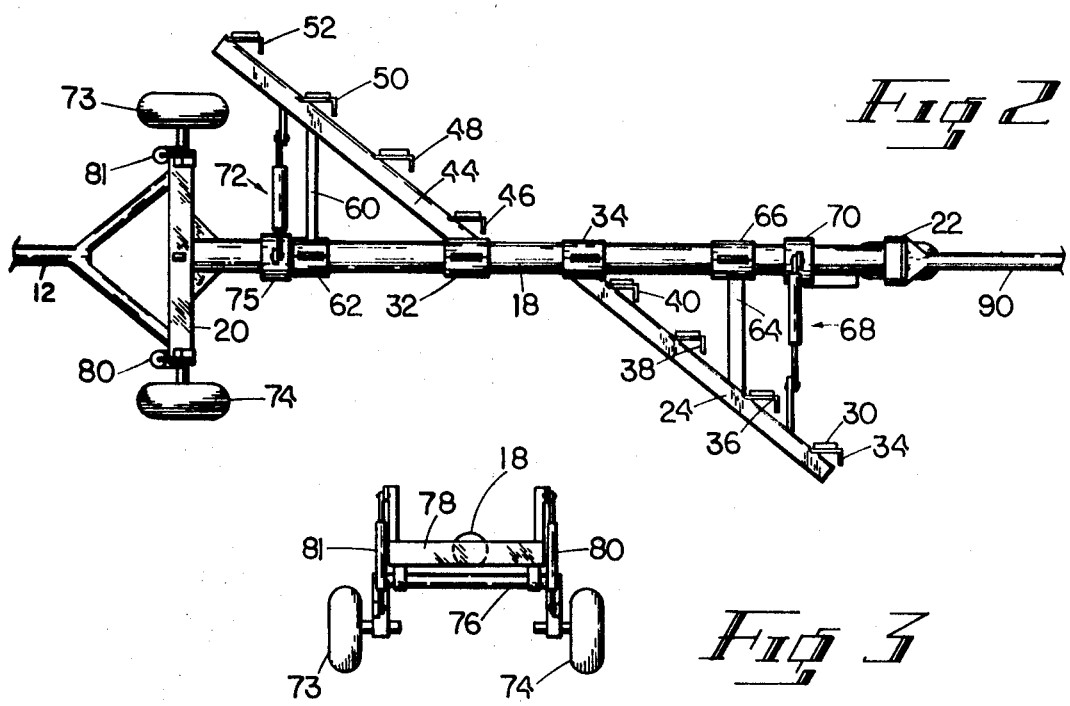
Fig. 2
Fig. 3
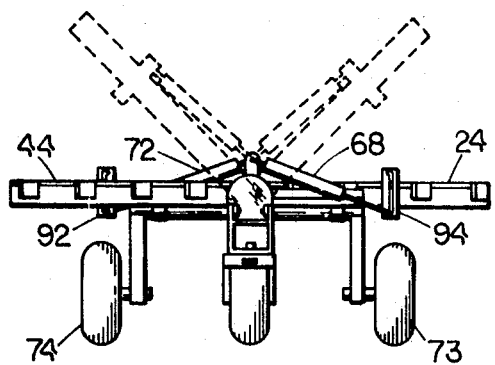
Fig. 4
INVENTOR
MERWIN J. MAXWELL
BY
Nimow & Frater
ATTORNEYS

ROLLOVER PLOW

This invention relates to improvements to rollover plows.

The function of a plow is to turn over the soil through which it is pulled. In accomplishing that task most plows, and certainly the most efficient plows, translate the soil to one side or other of the line of plow action. Accordingly plows are right or left-handed depending upon whether they move the turned over soil to one side or the other of the line of action. This characteristic of a plow prevents its being used efficiently to plow adjacent furrows while being pulled in opposite directions. Instead such plows must be pulled in the same direction while plowing successive furrows. This necessitates transporting the plow back to a point adjacent beginning of the preceding furrow each time a new furrow is to be plowed. It is common to incorporate a second plow in the plowing unit which is of the opposite hand in the sense that the soil that it turns over is translated to the opposite side of the direction of plow action from that of the plow first described. The use of two plows permits the continuous plowing of adjacent furrows despite the fact that the plow unit is being moved in opposite directions during the formation of those successive furrows. Plow units of this kind are often arranged so that the two plows extend in opposite directions from a common frame and so that the plow unit, or at least the plows, may be "rolled over" when the plow unit is drawn to the end of a furrow and the tractor or other apparatus pulling it is turned around to proceed in an opposite direction to the point of beginning. Rollover plows are often produced in multiple plow form so that several plows are drawn together through the soil in both of the rollover positions of the plow unit.

As the number of plows is increased, the width of the plow unit is increased because each plow must turn a separate furrow. Moreover, as the number of plows is increased the length of the plow unit is increased because the plows must be spaced in the direction of plow action since each translates the earth it turns into the line of action of another.

The number of plows that can be incorporated into a single plow unit is limited by the ability of the tractor or other pulling unit to pull them through the soil but the number is also limited because the plow unit is difficult to turn over in proportion to weight and to its width and its length. Beyond some number of plows the size of the tractor is determined by its ability to turn over the plow rather than by its ability to draw the plow through the earth. Accordingly it has been impractical to employ rollover plows including more than eight or ten plows, four or five for each rollover position.

It is an object of the invention to provide an improved rollover plow whose form makes it practical to employ a greater number of plows. The invention provides a plow having advantages over existing plows which make it desirable for use even in smaller rollover plows employing a number of plows no greater than what have been employed in previous units.

It is an object to provide a plowing implement which presents a uniform load to the tractor so that there is no tendency for the tractor to be pulled sideways. Further, it is an object of the invention to provide a plow whose form facilitates its being pulled by a tractor being driven relatively close to the last, previously plowed furrow whereby to simplify the task of steering the tractor and overcome a difficulty that attends many of the previously existing rollover plow designs. Other objects of the invention are to provide an improved rollover plow design which is relatively inexpensive to produce in rugged and reliable form and which is easy to maintain in that it employs a minimum number of moving parts which are readily accessible.

These and other objects and advantages of the invention which will hereinafter appear are realized in part by the provision of a rollover plow incorporating two plow frame members both of which are pivotally mounted for angular displacement about a common, substantially horizontal axis. Each of the two plow frame members is rotatable from a respective first position on one side of the axis over the top of the axis to a respective second position on the opposite side of the axis. At least two plows are carried upon each of the two frame members and the plows of each frame member extend oppositely therefrom in the plane of angular displacement of their frame member. Means are included for holding such frame members extended oppositely on opposite sides of the axis in their first positions and for angularly displacing both of the frame members about said axis to their respective second positions.

In the drawings:

FIG. 1 is a view in side elevation of a rollover plow embodying the invention being drawn by a tractor to which the plow unit is attached;

FIG. 2 is a top plan view of the plow unit of FIG. 1 with its plows removed;

FIG. 3 is a view in front elevation of the front carriage assembly of the plow of FIGS. 1 and 2; and FIG. 4 is a view in rear elevation of the plow unit of FIGS. 1 and 2 illustrating how the plow is "rolled over."

The plow unit 10 shown in FIG. 1 comprises sixteen moldboard plows carried on a frame so that eight plows extend downwardly and are operative and so that eight other plows extend upwardly out of engagement with the earth. The unit is designated an eight bottom, rollover, moldboard plow. The several plows of the unit are mounted in pairs upon the frame. One plow of each pair extends downwardly and the other plow extends upwardly. Each pair is mounted an arm which is secured at its midregion to the frame of the plow unit. The frame in this embodiment comprises a common, elongate, central supporting structure which is held substantially horizontal by front and rear, wheeled carriages. The frame also includes two plow frame members which are joined to the elongate supporting frame in the midregion along its length. One plow frame member extends rearwardly from its point of connection to the supporting frame and to one side where it is held in a substantially horizontal plane during operation of the plow. The other plow frame member extends forwardly from the central supporting frame structure and laterally to the other side of that supporting frame where it is held in a substantially horizontal plane during plow operation. The unit is attached by a tongue 12 to a tractor 14 which draws it over the earth represented by the line 16. Means are incorporated in the plow unit to raise and lower the central supporting frame so that the plows can be lowered into the ground and so that they can be elevated above the ground when the unit is turned around at the end of the field.

For identification, the elongate central supporting frame structure of the plow unit is designated by the reference numeral 18. The forward carriage is designated 20, the rear carriage is designated 20, the rear carriage is designated 22, the plow frame member which extends away from the page in FIG. 1 is designated 24. The plow set attached to plow frame member 24 at the outermost position includes the plow 26 and the plow 28. They are mounted at the ends of a mounting arm 30 which is fixed midway along its length to the frame member 24. Four such arms are attached to each of the two plow frame members and each set is mounted behind the preceding set in the direction of plow action which is parallel to the direction of the central support frame 18. In addition, each set of plows mounted on the plow frame member 24 is mounted so that its distance from the center supporting frame 18 is less than the distance from the center frame to the plow set behind it. The opposite is true of the four plow sets on the opposite side of the center supporting frame 18. The rearmost of those plow sets is closest to the center supporting frame and the most forward set is farthest from the center supporting frame.

This arrangement will be apparent in FIG. 2 although the plowshares themselves have been omitted from that figure for the sake of clarity.

The central mounting frame 18 extends between the front wheel carriage 20 and the rear wheel carriage 22. In this embodiment the front carriage comprises two wheels mounted upon a frame, the wheels are connected to the tongue 12 by which the plow is drawn along in the direction of plow action (i.e. the direction in which the furrows are turned). In this embodiment the central supporting frame 18 comprises a tubular structure which is encompassed near its midregion by two collars 32 and 34. These two collars are free to rotate, or at least to be angularly displaced through 180°, about a common axis which is the central axis of the tubular member 18. A plow frame member is fixed to each of these collars so that the frame member is pivotally connected to the central support frame 18 and is angularly displaceable around it from a horizontal position on one side of the central support or supporting frame to a horizontal position on the other side. Frame member 24 is connected to the collar 34 and it extends rearwardly from the collar and outwardly. This construction is advantageous but is not essential. It is necessary only that the plows, when there is more than one set connected to each of the frame members, be arranged so that they extend obliquely to the direction in which the plow unit is drawn. The several vertical arms upon which the plow sets are mounted are fixed to the frame member by brackets such as the bracket 34 by which plow arm 30 is secured to the frame. The spacing between the several brackets 36, 38 and 40 is uniform so that the spacing of the several plow sets is uniform in both the lateral and the lengthwise direction.

Another plow frame member 44 is fixed to the collar 32 and is rotatable with the collar from a horizontal position on one side of the center support frame 18 over the top of the center support frame to a position on its opposite side. Like the frame member 24 this frame member extends obliquely to the central support frame. However, it extends forwardly and to the side rather than rearwardly and to the side as does the frame member 24. Brackets 46, 48, 50 and 52 are mounted at spaced points upon the frame member 44. Like the brackets of frame member 24, the brackets of frame member 44 each carry a vertical arm upon which the plows of one set may be mounted.

To lend rigidity to the obliquely extending frame members and to support them, each of them is provided with a brace which extends from a point along its length towards the center support frame 18 where it is fixed to a collar which is rotatable about the tube that comprises the center support frame. Thus, the brace 60 is connected to the frame member 44 at one of its ends and is connected to a collar 62 at the other of its ends. Collars 62 and 32 rotate about the same axis so that the frame member 44 is readily rotatable from one side of the support frame to the other. The brace 64 extends from frame member 24 to a collar 66 which rotates about the center support frame 18 on an axis coincident with the axis of rotation of collar 34.

Means are provided in the invention for rotating each of the obliquely extending plow frame members from one side of the center frame upward past the longitudinal midplane of the plow unit and then downwardly to a position on the opposite side of the center support frame. In this embodiment that means comprises a hydraulic cylinder and piston assembly which is connected between the center support frame 18 and each of the obliquely extending frame members. Piston and cylinder assembly 68 are connected from frame member 24 to a bracket 70 on the center support frame. At the other end of the plow unit, piston and cylinder assembly 72 interconnect the frame member 44 with a bracket 74 carried by the central support frame. This mechanism may comprise a conventional hydraulic actuated cranking mechanism available in several forms, one of which is illustrated here. The two frame members 24 and 44 are cranked simultaneously and advantageously at the same rate so that the center of gravity of the plow unit remains in the vertical, longitudinal midplane through the plowing unit. As the frame members' arms are cranked the several plows move through an arc lying in a plane perpendicular to the axis of the central support frame 18. Each set moves in a plane which is parallel to the others and is spaced from the others in the direction of the length of the central supporting frame.

The movement of the frame members 24 and 44 from one side of the plow unit to the other "rolls over" the plows associated with them respectively. Thus, in FIG. 1 when the plow is rolled over that set of plows which is shown extending upwardly in FIG. 1 will extend downwardly instead and those plows that extend downwardly into the earth will extend upwardly instead.

Except that the two plow frame members 24 and 44 extend in opposite directions, one rearwardly and the other forwardly, from the midregion of the plowing unit the system is generally symmetrical. Thus the plowing unit tends to track directly behind its attachment point to the tractor. To this end the plows of each of the frame members 24 and 44 are located at a distance behind the succeeding plow and at a distance from the center support frame which is like the spacing and distance of the corresponding plow set connected to the other of the frame members.

In this embodiment the means for transporting the frame comprises a front and a rear wheeled carriage, the front one of which is best shown in FIG. 3. It includes two wheels 73 and 74 which are spaced a sufficient distance to insure lateral stability of the plow unit. The wheels are mounted upon a lower frame 76 which has pivotal connection to an upper frame 78 which permits raising and lowering of the upper frame and the central support frame tube 18 which it carries. A pair of hydraulic piston and cylinder sets, set 80 at the right and set 81 at the left in FIG. 3, are actuated hydraulically to pivot the lower frame 76 upon the upper frame 78 effectively raising and lowering the upper frame. At the rear of the unit the rear carriage comprises a single wheel which is mounted upon a bracket. The bracket has a pivotal connection to the central support frame 18 such that the separation of the axle of the wheel 84 and the central support frame 18 is increased and decreased as the wheel bracket 86 is rotated about its pivotal connection. A hydraulic piston and cylinder assembly 88 is connected at one end to the support frame 18 and at its other end to the bracket 86. As the piston is extended and retracted the bracket 86 is pivoted and the central support frame 18 and its plow units are raised and lowered. The several hydraulic cylinders and their pistons are actuated by hydraulic fluid delivered from a source of pressurized hydraulic fluid commonly part of the tractor through lines which are not visible in any of the drawings. The element 90 is only an extra tongue connected to the rear end of the plow unit to enable its being drawn from the other end when not in operation.

The manner in which the plow frame members 24 and 44 are raised is illustrated in FIG. 4. The solid lines illustrate the position of the arms 24 and 44 at the end of the rollover procedure when hydraulic pressure is relaxed and the outer end of the piston rod and the cylinder assembly is permitted to fall to the lower end of the slotted bracket in which it is carried. The bracket associated with arm 44 is designated by the reference numeral 92 and the bracket associated with the arm 24 is designated 94. The solid lines in FIG. 4 show the piston rod to be connected in a lower notch of the slotted bracket. This is the position at which the maneuver ends and from which the rollover procedure is begun. The piston arm remains locked in the same notch during the whole of the rollover procedure, the notch being the one at the lower part of the slot during the beginning of the procedure and being the upper notch of the slot at the end of the procedure. The dotted lines illustrate the condition of the turnover mechanism at a point past the midposition when the plow frame member is descending. When the descent is complete the hydraulic pressure is relaxed and the piston rod simply falls to the lowermost notch ready for the next rollover procedure.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A rollover plow comprising in combination:
    two plow frame members individually pivotally mounted for angular displacement about a common, substantially horizontal axis from a respective first position on one side of said axis over said axis to a respective second position on the opposite side;

at least two plows carried upon each of said two plow frame members, the plows of each plow frame member extending oppositely therefrom in the plane of angular displacement of the plow frame member;

and means for holding said plow frame members extended oppositely on opposite sides of said axis in their respective first positions and for angularly displacing said plow frame members in opposite directions about said axis to their respective second positions.

2. The invention defined in claim 1 which further comprises a horizontal mounting frame on which said two plow frame members are pivotally mounted and which further comprises means for elevating and lowering said mounting frame to different horizontal planes.

3. The invention defined in claim 1 including at least four additional plows and in which at least four plows are mounted on each of said plow frame members such that a first two of the four extend downwardly and the other two extend upwardly, when said plow frame members occupy their first and second positions, and such that the plows of the first two and of the second two plows are disposed in parallel planes spaced along said axis.

4. The invention defined in claim 3 in which each downwardly extending plow of one plow frame member is disposed at a distance from said axis like the distance at which a respectively corresponding downwardly extending plow of the other plow frame member is disposed.

5. The invention defined in claim 4 in which the plows of each plow frame member are arranged in pairs, the plows of a pair extending in opposite directions from the plow frame member and successive pairs, after the first pair, being disposed more distantly from the points at which both plow frame members are pivoted about said axis.

6. A rollover plow comprising in combination:

an elongate support frame;

means by which said support frame may be transported in the direction of its length while disposed substantially horizontally;

two plow frame members individually pivotally mounted upon said support frame and extending obliquely therefrom one in the direction of one end of said support frame and the other in the direction of the other end of said support frame, said plow frame members being being capable of angular displacement in opposite directions about an axis extending in the direction of the length of said support frame from a substantially horizontal position on one side of said support frame to a substantially horizontal position on the other opposite side of said support frame;

and means for mounting plows upon said two frame members at points along their length spaced at successively greater distance from said support frame and the other of said plow frame members.

7. The invention defined in claim 6 which further comprises pairs of plows mounted upon each of said plow frame members such that one plow extends upwardly and one plow extends downwardly in each of the two substantially horizontal positions of said plow frame members.

8. The invention defined in claim 7 in which said means for transporting said support frame comprises means for elevating and lowering said support frame to different horizontal planes.

9. The invention defined in claim 8 in which said means for transporting said support frame comprises means for maintaining said support frame against rotation about the axes of angular displacement of said plow frame members.

10. The invention defined in claim 9 which further comprises means for angularly displacing the said plow frame members simultaneously from one of their substantially horizontal positions to the other of their substantially horizontal positions.

11. The invention defined in claim 10 in which said means for angularly displacing said plow frame members comprises a pair of hydraulic actuating elements one for each of said frame members.

12. The invention defined in claim 10 in which said means for elevating and lowering said support frame comprises means for elevating and lowering the ends of said support frame in different degree.

13. The invention defined in claim 10 which further comprises a plurality of pairs of plows mounted upon each of said two plow frame members and extending vertically in opposite directions therefrom when said plow frame members occupy their substantially horizontal positions.

UNITED STATES PATENT OFFICE
CERTIFICATE OF CORRECTION

Patent No. 3,604,516      Dated September 14, 1971

Inventor(s) Merwin J. Maxwell

It is certified that error appears in the above-identified patent and that said Letters Patent are hereby corrected as shown below:

Column 2, line 25, after "mounted" should read -- on --; lines 48 and 49, cancel "the rear carriage is designated 20". Column 3, line 58, "74" should read -- 75 --. Column 6, line 1, cancel "being", second occurrence.

Signed and sealed this 10th day of October 1972.

(SEAL)
Attest:

EDWARD M. FLETCHER, JR.
Attesting Officer

ROBERT GOTTSCHALK
Commissioner of Patents